Oct. 17, 1944.　　　O. C. HEDIN　　　2,360,772
MACHINE TOOL
Filed March 1, 1943　　　8 Sheets-Sheet 1

Inventor:
Oscar C. Hedin,
By: Harold Olson
Attorney

Oct. 17, 1944.　　O. C. HEDIN　　2,360,772
MACHINE TOOL
Filed March 1, 1943　　8 Sheets-Sheet 2
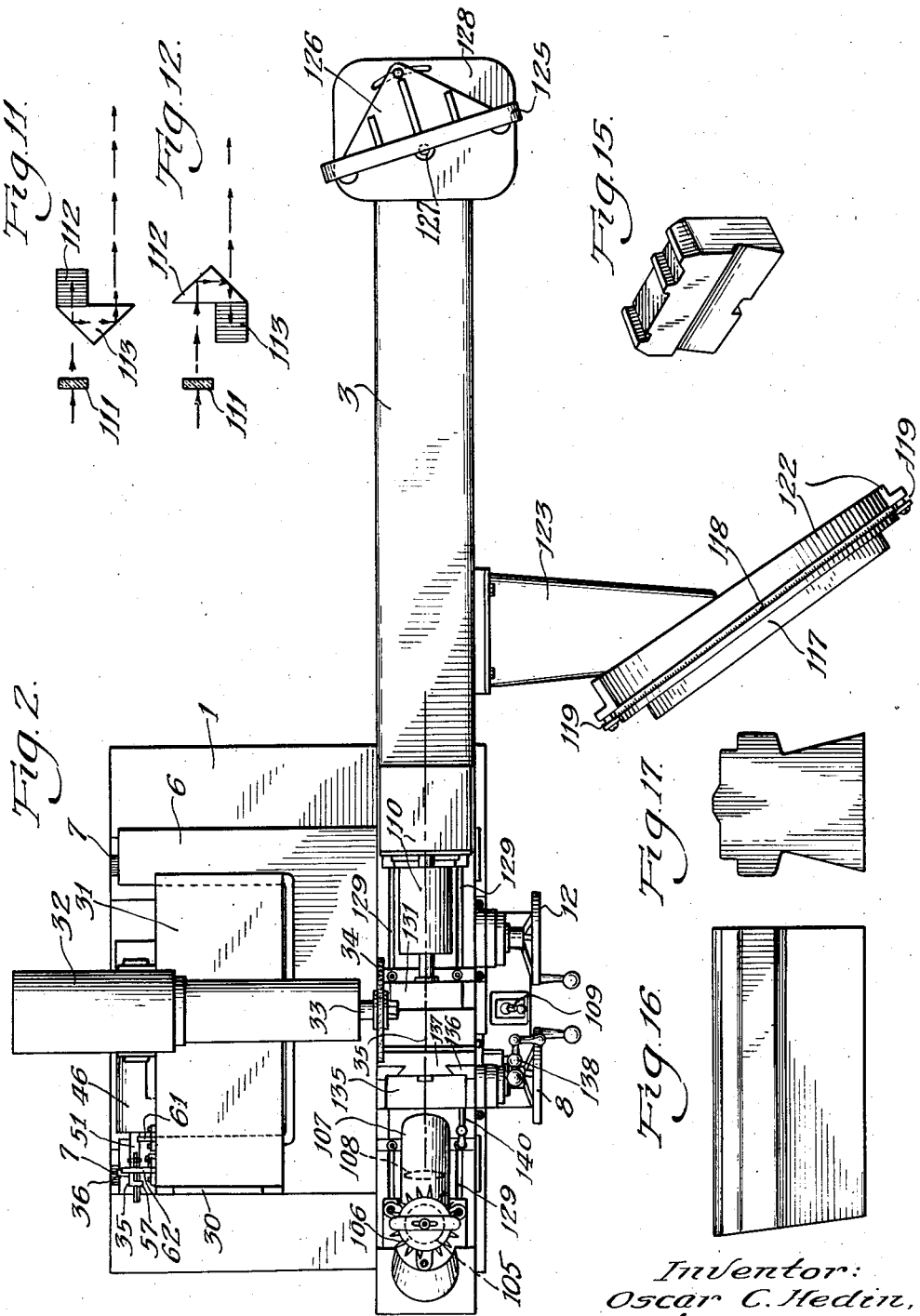
Inventor:
Oscar C. Hedin,
By Harold Olsen
Attorney

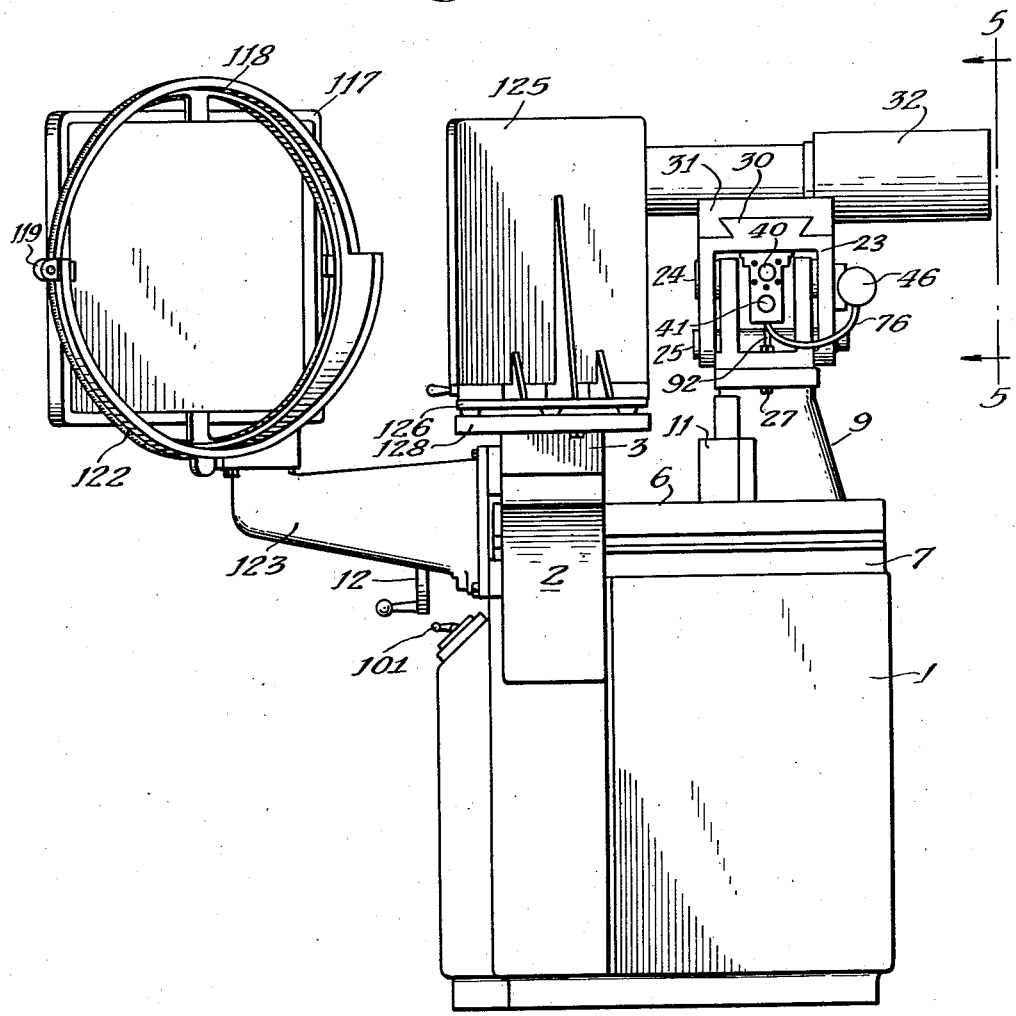

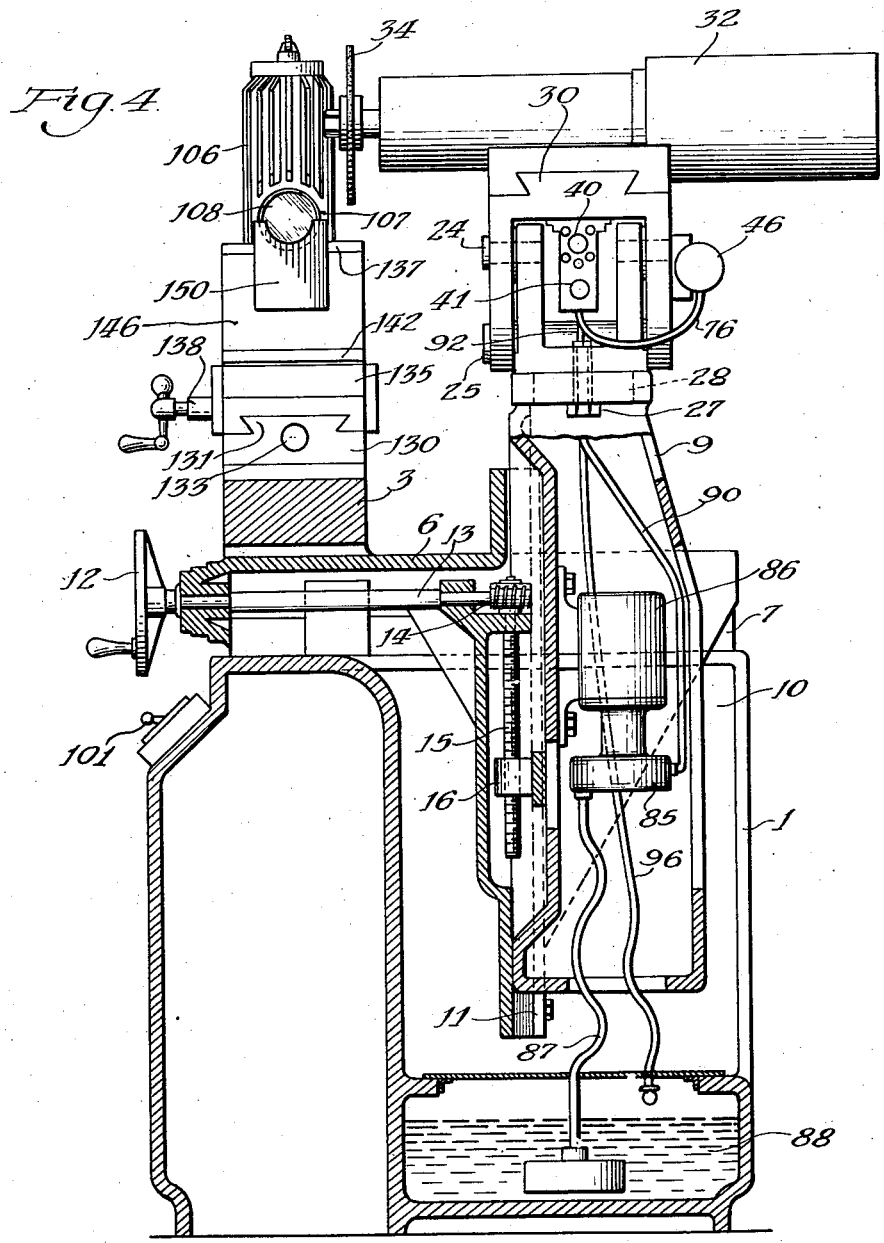

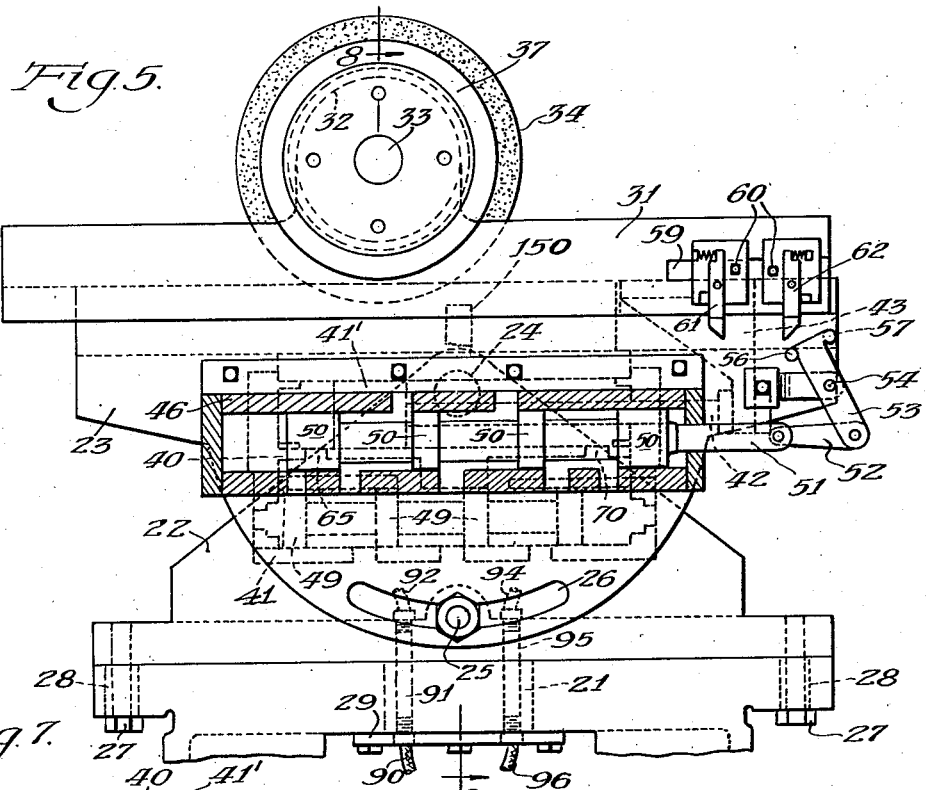

Oct. 17, 1944.   O. C. HEDIN   2,360,772
MACHINE TOOL
Filed March 1, 1943   8 Sheets-Sheet 6

Inventor:
Oscar C. Hedin,
By Harold Olsen
Attorney.

Oct. 17, 1944.   O. C. HEDIN   2,360,772
MACHINE TOOL
Filed March 1, 1943   8 Sheets-Sheet 7

Inventor:
Oscar C. Hedin,
By: Harold Olsen
Attorney

Oct. 17, 1944. O. C. HEDIN 2,360,772
MACHINE TOOL
Filed March 1, 1943 8 Sheets-Sheet 8
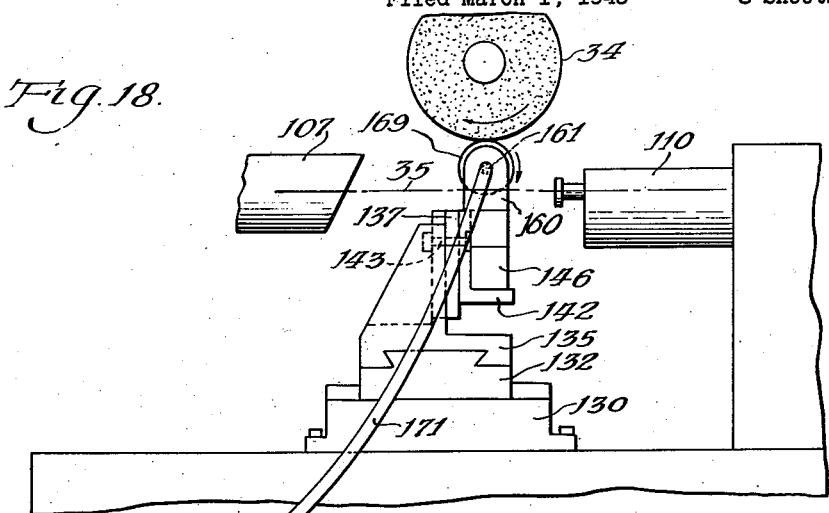
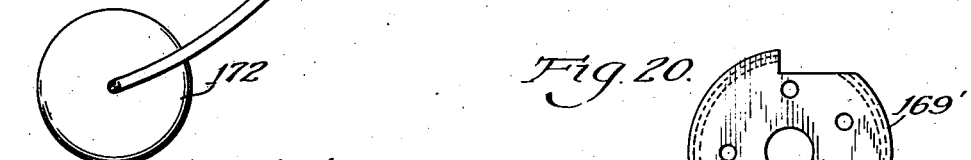
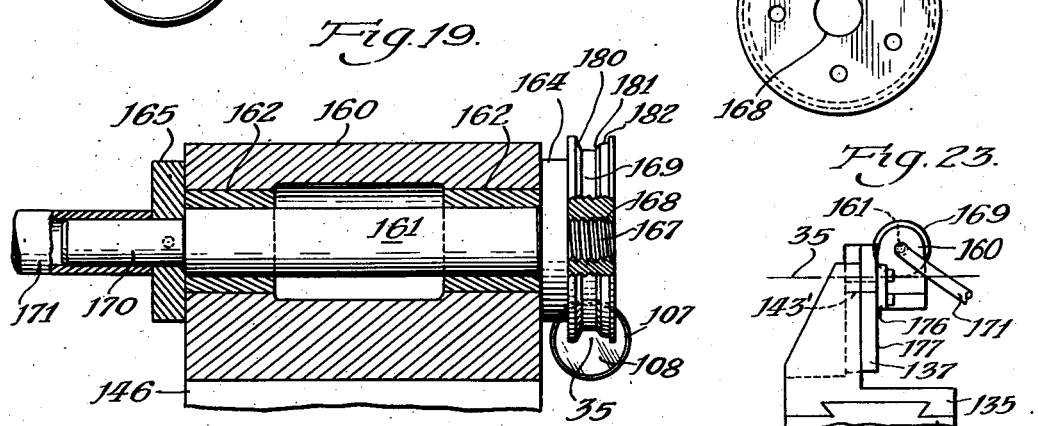
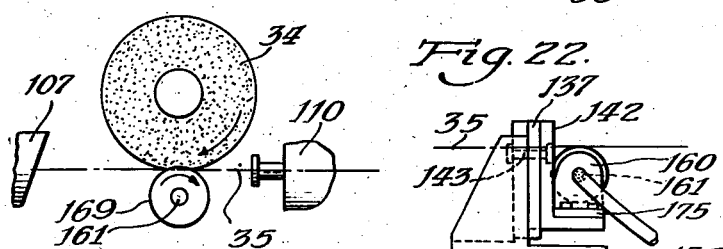
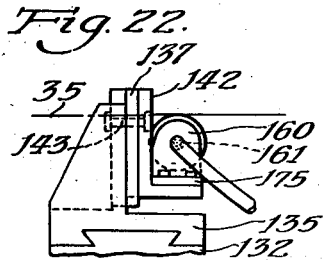
Inventor:
Oscar C. Hedin,
By: Harold Olsen
Attorney Patented Oct. 17, 1944

2,360,772

UNITED STATES PATENT OFFICE 2,360,772

MACHINE TOOL

Oscar C. Hedin, Cleveland Heights, Ohio, assignor to The Weldon Tool Company, Cleveland, Ohio, a corporation of Ohio Application March 1, 1943, Serial No. 477,573

19 Claims. (Cl. 51—165)

This invention relates to improvements in constructions of machine tools, as well as to methods of using the same. The invention provides methods and means which are particularly useful in facilitating the accurate formation of cutting edges on tools or for giving any desired contour to a piece of metal. The invention has found valuable use in the profile shaping and grinding of very hard metals known as "carbides," by the use of a thin diamond wheel and by an operation known as "bump" grinding. The invention is, however, usable for shaping other metals or for forming substances other than metals.

The method and machine of this invention are particularly adapted for producing regularly or irregularly shaped cutting edges on flat-form tools of hard metal, along with proper clearances for such edges, and with the assistance of an optical inspection device by which during shaping, light is projected across the periphery of the work-piece in a manner to obtain an enlarged profile shadow of said periphery on a shadow screen for comparison with a very much enlarged scale master drawing placed on the screen, which drawing is an exactly proportional representative of the contour which is to be given to the piece.

Heretofore, when an enlarged shadow of the periphery of such work-piece of irregular contour was to be projected on a shadow screen for comparison with a master drawing, to assist in accurately shaping the work, the preparation of such a drawing preliminarily required mathematical calculations well known to the art, and on the basis of these calculations a drawing not strictly proportional to the outline desired for the tool was made. Such a drawing may be referred to as "distorted." In making flat-form tools with irregular cutting edges, including curves, and where cutting clearance is to be provided, it has heretofore been the practice to so hold the workpiece that that face which is to constitute the cutting face of the tool is at an angle, to a plane perpendicular to the optical axis, equal to the angle of the required clearance; thus the surface to be cut was made parallel with the optical axis.

The necessity for using distorted drawings in relation to the old devices of the general kind treated of herein is so well known that it seems unnecessary to consider with more particularity the various calculations which must be made in order to obtain a distorted drawing. Obviously, however, the mathematical calculations become quite complicated where the number of curved and angular elements required for the cutting edge are increased, so the practice of my invention is all the more desirable.

The practice of one phase of the present invention avoids tipping of the work-piece, and avoids the use of distorted master drawings. No engineering calculations are therefore necessary. I therefore believe that the practice of my invention greatly simplifies the work-shaping process. The enlarged master drawings can now be made in exact proportion to the required profile, and can be very accurately made on a machine such as that disclosed in my copending application for Drawing machine and lay-out table, Serial No. 459,102.

To obtain the above mentioned results I place the cutting face of the tool-piece in perpendicular relation to the optical axis and by means of my improved tool or work-piece holder disclosed herein shape the piece, using an enlarged master drawing as a guide, and while shaping give to said piece the desired cutting relief. In this case the surface of the work-piece on which the tool, for example a grinding wheel, is operating is not parallel with the optical axis but is at an acute angle thereto. Thus, by maintaining the above mentioned perpendicular relation throughout the shaping operation, engineering calculations for and the use of a distorted drawing are unnecessary, and therefore the operation is much simplified while there is considerable gain in respect of accuracy.

While the invention includes a very important use of a type of device in which enlarged shadows of the work and tool are projected onto a shadow screen for comparison with a very much enlarged scale master drawing representative of the contour to be given to the piece, the invention is not entirely limited to the use of such a system.

An important object of the invention is to provide a very simple structure by which cutting of a piece of work can be obtained as a result of adjustments of the tool, and/or of the work, and particularly herein the bodily movement of the tool-driving means and/or of the mounting means.

An important object of the invention is to have a compact structure in which the workpiece as well as the shaping tool and all of the controls and the optical system are close to the operator and are easily accessible for inspection and manipulation. Another object is to have a work holder which can be properly adjusted in relation to the optical axis for the above purposes, as well as to provide a work holder with which substitute fixtures may be used so that the cutting face of a work-piece can be held perpendicular with the optical axis, or such a cutting face can be held at angles other than perpendicular to said optical axis.

Another object of the invention is to provide a rotative tool and to have the tool-operating means move with the tool and to have the operative means and the tool bodily adjustable at various angles and in various planes in relation to the optical axis and to the work holder. Another object is to provide work-holding means by which the periphery of the work can always be adjusted in relation to the tool and to the optical axis.

Another important object is the placement of a grinding wheel and its operating means on the top of a saddle and in full view of an operator, with arrangements such that the whole assembly, including the tool and means for simultaneously rotating and reciprocating it can be brought forwardly toward and near to the operator, and toward the work-piece and toward the optical system.

Another object of the invention is to provide, in a metal-working machine which uses an optical system having a shadow screen; a tool with its operating means therefor and with its adjusting means all mounted on a saddle, and to have the work and optical system on a common stationary support at the front of the machine and over the saddle.

Features of the invention include: The arrangement of the tool and its operating and adjusting means on a saddle; the arrangement of the tool and its operating means in plain view and close to the operator and to the optical system; the bodily adjustment of the tool in a horizontal direction perpendicular to the optical axis of a shadow-screen optical system; the mounting of vertical adjusting means for a tool on a saddle which moves toward the optical system; the bodily adjustment of the tool and its operating means rotatively on a vertical axis; the bodily adjustment of the tool and its operating means on a horizontal axis which is parallel with the rotative axis of the tool; the adjustment of the work in two horizontal planes parallel with the optical axis and also vertically with reference to the same axis; the circular adjustment of the work holder on an axis which is parallel with the optical axis; the arrangement of the optical system at the front of the machine on a stationary base and the arrangement of the tool supporting and adjusting means also on said base at the front of the machine; the reciprocation bodily of the tool into and out of engagement with the work by means which is carried by supporting means for the tool and which supporting means can be adjusted circularly on a vertical axis and rocked on a horizontal axis which is parallel with the axis of rotation of the wheel and which is perpendicular to the optical axis; the use of fluid-operable means for reciprocating the tool slide; the specific hydraulic means used; the mounting of the motor and pump for operating the hydraulic means on a support which is carried by the saddle and which is vertically adjustable on the saddle; broadly, the means by which irregular cutting contours can be formed simultaneously with clearance in relation to an optical system in which an enlarged shadow of the work is projected onto a screen during shaping operation, all without requiring the use of a distorted master drawing on the shadow screen; the provision of means for circularly adjusting the work on means by which the work can be vertically adjusted in relation to the optical axis of the optical system; all details of construction shown or described; and all broader ideas of means inherent in the disclosure as a whole.

Objects, features and advantages of the invention are set forth in the description of the drawings, and in said drawings:

Fig. 2 is a plan view of Fig. 1;

Fig. 3 is an end elevation looking from line 3—3 of Fig. 1 in direction of the arrows;

Fig. 4 is a vertical transverse section taken approximately on line 4—4 of Fig. 1 looking in the direction of the arrows;

Fig. 5 is a rear elevation of the tool mounting and operating means partly in section, looking from line 5—5 of Fig. 3 and in the direction of the arrows;

Fig. 6 is a fragmentary top plan view of Fig. 5 further illustrating the tripping mechanism;

Fig. 7 is a somewhat diagrammatic view of one form of fluid operating means suitable for reciprocating the tool slide, the parts being positioned in correspondence to Fig. 5;

Figs. 11 and 12 are diagrammatic views of parts of the optical system taken at right angles to one another;

Fig. 15 is a perspective view illustrating a product of my machine;

Figs. 16 and 17 are respectively a side view and an end view additionally illustrating a product of my machine;

Fig. 18 is a somewhat diagrammatic view illustrating how circular form tools can be shaped in relation to a shadow-producing optical system, and illustrating my method for so doing, and showing the bottom portion of the tool-piece periphery in the optical axis;

Fig. 19 is a longitudinal section showing means for holding a circular tool-piece or work-piece on a rotative shaft;

Fig. 20 is a side view of a tool-piece;

Fig. 21 is a diagrammatic view showing both the circular tool-piece and wheel, in the optical axis;

Fig. 22 is a modification showing how the block for the tool-piece-holding shaft can be attached to an angularly adjustable fixture; and Fig. 23 is a view showing how the shaft-block can be attached directly to the vertical slide.

Figure 1:
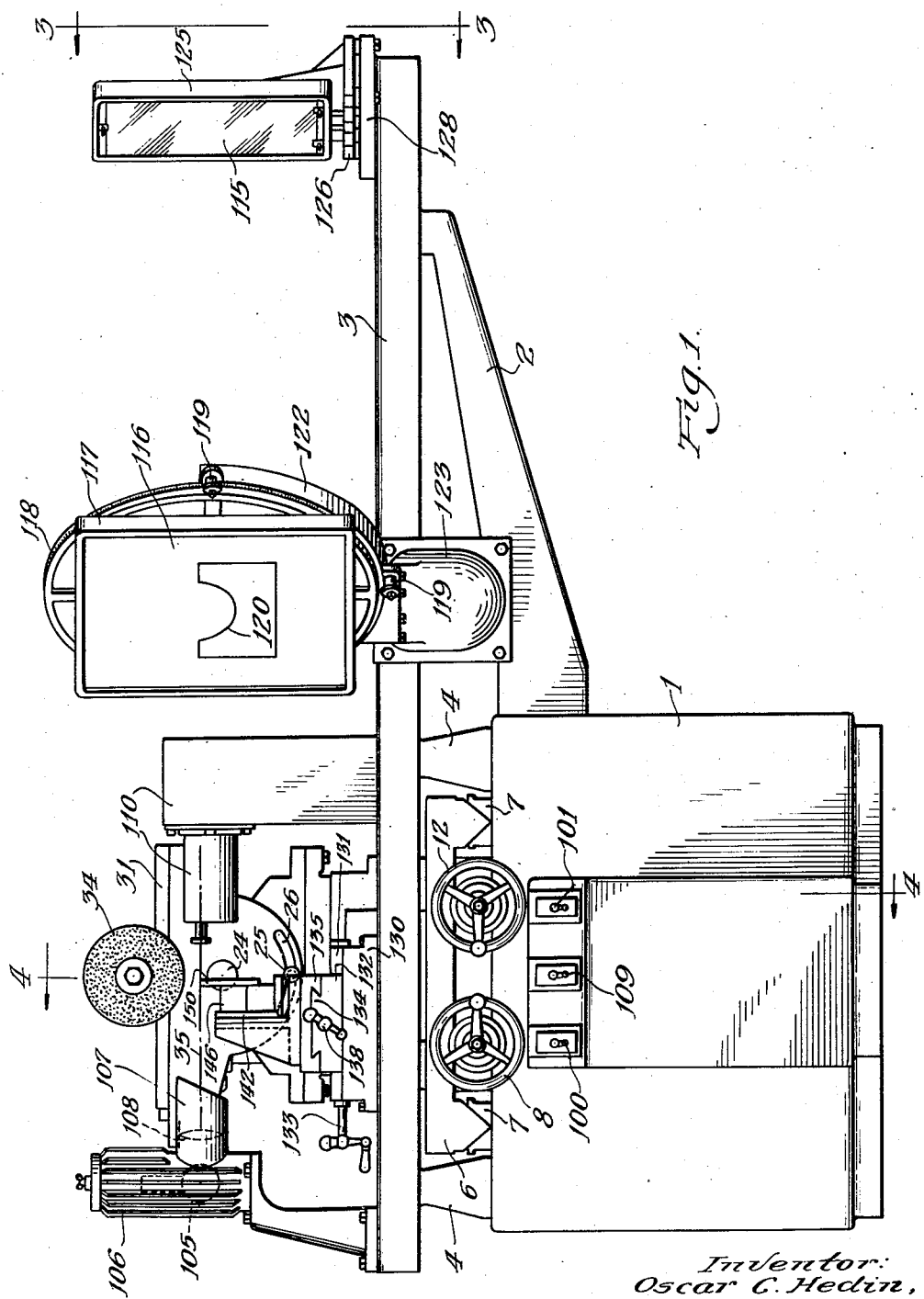
Fig. 1 is a front elevation illustrating one embodiment of my invention.

Now referring to the drawings which illustrate one claimed embodiment of my invention, and first to Fig. 1. The numeral 1 indicates the hollow bed of the machine having thereon a laterally extending arm 2 supporting the outer end of a table 3, said table being also supported on the bed as by struts 4. On this stationary table the work holder and shadow-producing optical system are mounted, at the front of the bed, see Fig. 2. The table bridges a saddle indicated at 6 and the saddle is movable in a horizontal plane in direction from front to back of the machine on ways 7. The bridging relation of the table to the saddle is a feature, as is also the arrangement of a stationary table at the front of the bed. Movement of the saddle is controlled by a hand wheel 8 operating a shaft in threaded engagement with a nut carried by the bed, so that the control wheel moves with the saddle.

Now referring to Fig. 4. The saddle has mounted thereon a hollow vertical slide generally indicated at 9 and this slide extends downwardly within the bed. The bed provides a rear chamber 10, open at the back to allow for sufficient excursion of the slide vertically, as well as horizontally during adjusting motions of the saddle to move the tool in relation to the work holder. The slide 9 is held in suitable vertical guides 11 of the saddle 6 and its vertical movement is controlled by a wheel 12, a shaft 13, worm wheels 14, and screw shaft 15 operating in a nut 16 of the slide. Thus, the saddle can move from front to back in a horizontal plane and the slide 9 can move perpendicularly to that plane and vertically on the saddle.

The vertical slide 9 may be said to form part of a mount for the tool and its operating means. The tool in this instance is shown as a grinding wheel, but it will be understood that other rotative types of tools may be used, or that types of tools other than the rotative type may be used. The use of a wheel in the combination is, however, a claimed feature.

Now referring to Figs. 5 to 8. It is a feature of this invention that the tool, whatever its type, is adapted for bodily adjustment in various planes and angularly in relation to those planes, and in relation to planes of adjustment of the work. By means of the saddle the tool is adjustable horizontally from front to back of the machine. By means of the slide mount or carrier 9 the tool is adjustable vertically and perpendicularly to the direction of adjustment of the saddle. By the means now to be described the tool can be angularly adjusted on two axes perpendicular to one another, one a vertical axis and the other a horizontal axis. It is further noted that in this embodiment the horizontal axis is normally parallel with the direction of adjustment of the saddle and is perpendicular to the optical axis of the optical system. This axis is angularly adjustable about a vertical axis in a manner now to be described.

Figure 8:
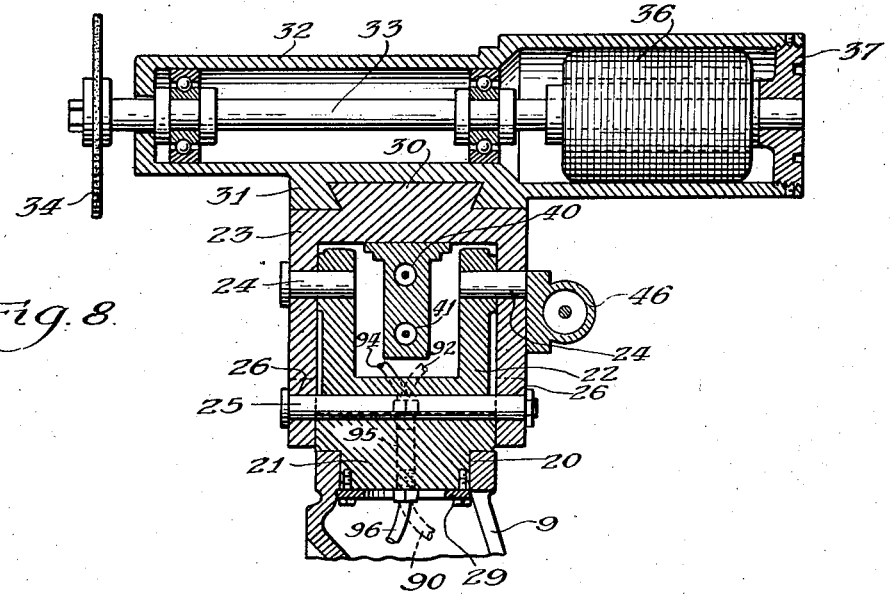
Fig. 8 is a vertical section of the tool-adjusting assembly at the top of the vertical side of the saddle, taken approximately on line 8—8 of Fig. 5.

Referring first to Fig. 8. The top of the slide 9 has a vertical opening 20 therein and rotative in that opening is a cylindrical boss 21 projecting from the bottom of a mounting member 22. On upward extensions of this mounting member 22 is mounted a rock frame 23, the mounting being by means of suitable trunnion-like bearings indicated at 24. These bearings constitute a horizontal axis about which the frame 23, and therefore the tool, is adjustable angularly. The rock frame 23 is held at any angularly adjusted position by means of a bolt 25 passing through the mount member 22 and through slots 26 in downward extensions of the rock frame 23. The mount member 22 is held in place by a suitable ring 29 and bolts connected to the boss 21 as shown. Bolts 27 passing through arcuate slots 28 (see Figs. 4 and 5) clamp the mount member 22 in any desired position. In boss 21 are any suitable number of passages with which flexible tubular elements of a fluid power system are connected.

Mounted on a suitable way 30 at the top of the rock frame 23 is a tool slide 31, see also Fig. 5. A feature of this invention relates to the use of a grinding wheel or other suitable rotative tool and its mounting on the slide. In this case a shaft 33 is suitably journaled in a casing 32 and this shaft is in this instance parallel with the axes of the pivoting elements 24. The casing 32 extends forwardly and rearwardly of the slide as shown. A grinding wheel of any suitable material and size and having the proper peripheral cross-sectional contour is represented at 34. Arrangements are made so that various sizes and types of wheels can be substituted on the shaft 33. Another feature is that the driving means for the shaft 33, and whatever tool is carried thereby is mounted for movement with the slide. In this instance the driving means is a motor 36 mounted and properly held in the casing 32. The end of the casing is closed by suitable means indicated at 37, which forms a bearing for shaft 33.

Now referring to Figs. 5, 6 and 7. Another feature of the invention is that the slide 31 is reciprocated by means which is also carried by the rock frame 23. Thus, the driving means for the tool and the reciprocating means for the slide are all bodily adjustable along with the tool, when it is necessary to adjust the tool in relation to the work. Moreover, it will be noted that the tool is adjustable linearly in two planes which are at right angles to one another and angularly on two axes which are perpendicular to one another, one of these axes being parallel with the vertical linear adjustment of the other axis and being parallel with the horizontal linear adjustment. The axis of boss 21 is perpendicular to the optical axis 35, see Figs. 1 and 2. The axes of 24 and 33 are normally perpendicular to the optical axis, but when moved about boss 21 as a center, can assume various angular relations with the optical axis.

A fluid operable system is shown somewhat diagrammatically in Fig. 7 and this fluid system is shown applied in Fig. 5. For simplification and clarity the tubular connections for and between the cylinders of Fig. 5 are omitted and for simplification some of said connections are somewhat diagrammatically shown in some of the other figures of the drawings. Cylinders 40 and 41 are placed within the mount element 22 and within and attached to the rock element 23, see Fig. 8. Cylinder 40 has therein a piston 41' connected by rod 42 to a bracket 43, in turn connected to the slide 31. The fluid power, in this case hydraulic, system includes a third or master cylinder designated 46 and this cylinder has been shown in section in Fig. 5 and is placed on the outside of the rock frame 23, see Figs. 3 and 8. The cylinder 41 has four reversing valves connected for movement in unison therein and related to suitable ports arranged as shown, see also Fig. 7. In the master cylinder 46 are four valves movable in unison in relation to suitable ports as shown. The valves in the cylinder 41 are generally designated by the numeral 49, and the valves in the cylinder 46 are generally designated by the numeral 50. Valve 50 is connected by a suitable rod 51, which in turn is connected by a link 52 to a rock lever 53. This rock lever, see also Fig. 6, is pivoted to the rock frame 23 as at 54 and has at its upper end oppositely projecting lugs respectively indicated 56 and 57. Lug 56 extends in a direction away from the slide, the lug 57 in a direction toward the slide, and as shown. The lugs project from opposite sides of the lever 53. Arranged to slide in a suitable groove 59 of the slide 31 are tripping assemblies and these assemblies are linearly adjustable in the groove and each is held by suitable means generally indicated at 60.

Pivoted tripping finger 61 is adapted to engage lug 57 and pivoted tripping finger 62 is adapted to engage lug 56.

It is assumed, in the figures, that the lever has just been moved to the position shown and that finger 62 has therefore just released lug 56. The lever is now so positioned that fluid is just entering port 65 of cylinder 40. As soon as the piston 41' has been moved almost to its extreme right position, the finger 61 engages the lug 57 and moves the lever 53 to the opposite position to correspondingly move the valves 50 to their extreme left position, whereupon port 66 of cylinder 46 will be put in communication with port 67 of the same cylinder to result in movement of the valves 49 to their extreme right position so that fluid will enter port 70 of cylinder 40 and fluid will be cut off to port 65 of that cylinder. The main power pipe line is indicated at 75 and it has branch lines 76 and 77. The device is also provided with means 78 by which the pressure in the system may be varied. Exhaust lines are indicated at 80 and 81 in Fig. 7.

Now referring to Figs. 4 and 5. A suitable pump 85 for the fluid power system is mounted within the hollow vertical slide 9 and is provided with a suitable pump motor 86. The intake of the pump is in communication through a flexible connection 87 with an oil supply tank 88 arranged in the bottom of the bed. The delivery side of the pump is in communication by a flexible pipe 90, with an opening 91 (see Figs. 5 and 8) in the pivoting boss 21 for the mount 22. Suitable connection by flexible pipe 92 is made at the upper side of the opening 91 with the power pipe 75, see Fig. 7. The exhaust lines 80 and 81 are suitably connected to a flexible pipe indicated at 94 (see Fig. 5) which is in turn connected with an opening 95 in the boss 21. The bottom of this opening 95 is connected through a flexible pipe 96 (see also Fig. 4) to deliver into the oil supply tank 88.

It does not seem necessary to show in more detail the various power and exhaust connections since it is believed that these connections are within the skill of the art. It will be seen, however, that substantially all of the slide-driving system is so carried as not to interfere with any of the positional adjustments of the tool in relation to the work and to the optical axis. The cylinders are mounted on and move with the rock frame. While this particular system as applied to a tool slide for the purposes herein is believed new in my combination and is claimed, the broad idea of adapting the slide-operating means to move with the mount for the slide is independent of the specific means shown.

The electrical connections of the motors 36 and 85 have not been shown, but it is believed within the skill of the art to provide these connections. However, the switches for the control of these motors are arranged at the front of the machine, see Figs. 1 and 4. The switch for the motor 36 is indicated at 100 and the switch for control of the motor 85 is indicated at 101.

Now referring to Figs. 1 and 2. An important feature of this invention, separate from the claimed details of the various constructions heretofore described, but in combination with a tool adjustable in various planes in relation to a work piece, is the provision of an optical system by which an enlarged shadow of the periphery of the work at the shaping point can be projected onto a shadow screen. The arrangement of such a system on the stationary table 3 is a feature of the invention, as is also the arrangement of this table to bridge the saddle, and as is also the arrangement of the work holder between elements of the optical system so that work and tool can be kept in the optical field.

The general arrangement of the parts as shown in Fig. 2 makes for compactness and is a feature. The optical system comprises a light source 105 enclosed in a suitable casing 106. To this casing is attached a tubular extension 107 wherein is arranged a suitable condenser lens 108. A switch 109 at the front of the machine controls the light 105 through suitable electrical power connections which have not been shown. Spaced a suitable distance lengthwise from the extension 107 is a casing 110 in which are suitable objective lenses and prisms which are adapted to project an enlarged image onto a screen of work held by a work holder, later to be described. One type of suitable optical system is diagrammatically shown in Figs. 11 and 12, and comprises an objective 111 and two prisms respectively indicated 112, 113. The system shown in Figs. 11 and 12 is commonly known as a porro-prism system and is for the purpose of obtaining an enlargement and of obtaining the proper relation of the image to the work. There is no intention, of course, to be entirely limited to the character of the elements of the system, since any elements which will give clear definition and allow for proper focusing will serve. Focusing can be accomplished by movements of the work holder, and a work holder capable of such movements is later described. The elements of the optical system should, of course, include a light source associated with a condenser lens located at one side of the work holder, and at the opposite side of the work holder there should be disposed an objective and any other suitable optical devices by which the profile shadow of the work and part of the tool operating thereon is magnified and projected onto a shadow screen. In this case the magnified shadow is received by a mirror 115, by which it is reflected onto a shadow screen 116, see Fig. 1.

It is noted that the elements of this system are alined in a direction perpendicular to the direction of movement of the saddle. The optical system is ordinarily enclosed in a housing to exclude such extraneous daylight or other illumination as would dilute the cone of light that extends from the objective lens to the screen by way of the mirror. With this arrangement of the elements the cost of such a housing is considerably less than the cost of housings of the ordinary comparing machine. A rectangular frame or ground glass holder 117 is mounted on a ring 118 which is rotatably held in rollers 119 of a support. Thus the screen can be rotatably adjusted on a horizontal axis and this adjustment is complemental to a similar adjustment of a work-carrying fixture of the work holder, presently to be described. By means of the ring which is graduated, the screen can be rotated to bring the enlarged drawing into registration with enlarged shadows of the tool and work. An enlarged master drawing or delineation is generally indicated by the numeral 120, and as heretofore noted, an important phase of this invention permits the use of an undistorted master drawing. It is to be understood that in the practice of one phase of this invention the outline of this enlarged scale master drawing corresponds exactly to the outline desired to be given to the work. This outline is commonly made on translucent paper and the paper is applied to the glass and is suitably held. An enlarged shadow of a part of the cutting tool 34 is also projected onto the screen in relation to the drawing 120.

The rollers 119 are carried by a suitable semi-circular frame 122, in turn mounted on an arm 123, see Fig. 2, which arm is attached as shown to the table 3 and to the arm 2, see Fig. 1. The frame 125 for the mirror is mounted on a suitable base 126 (see Figs. 1, 2 and 3), and this base is pivoted at 127 to a pad 128 of the table 3. Pivot 127 permits proper angular adjustment of the mirror in relation to the objective and to the shadow screen.

A transparent plate (not shown) is located between the tube 107 and the work holder to prevent injury of the adjacent surface of the condenser lens 108 by metal or abrasive particles incidental to the metal-shaping operation.

It will be noted that the circular adjustment of the screen is complemental to the circular adjustment of the fixture about the bolt 143, or about an equivalent axis. The entire optical system and work are stationary in relation to the movable tool.

It will be understood that the work-piece will be intermittently moved in order to keep that part of its periphery which is being operated upon, in the optical field or axis. When movement of the work piece is necessary the grinding wheel (or the tool) is moved away while this adjustment of the work-piece is being made.

Figure 9:
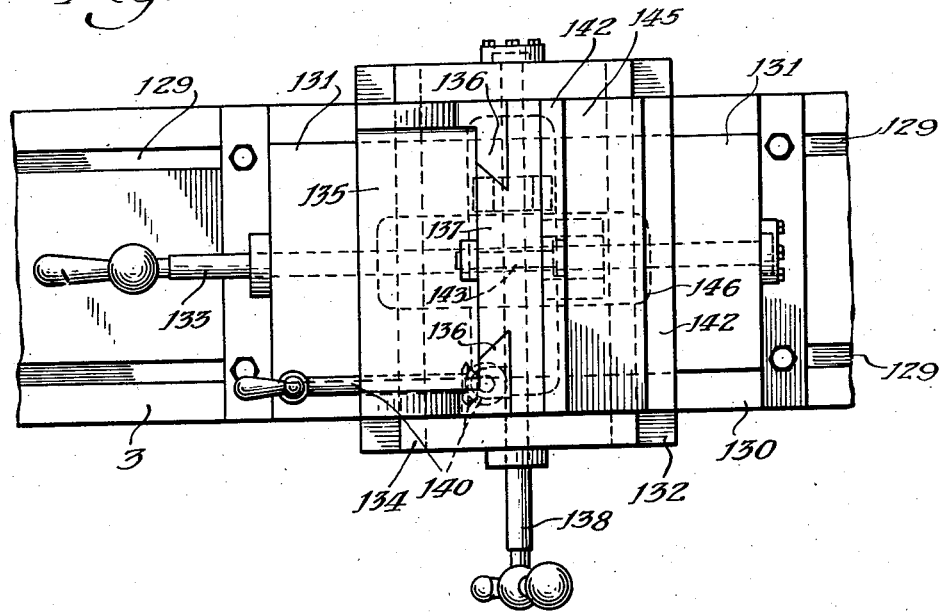
Fig. 9 is a top plan view of the work holder.
Figure 10:
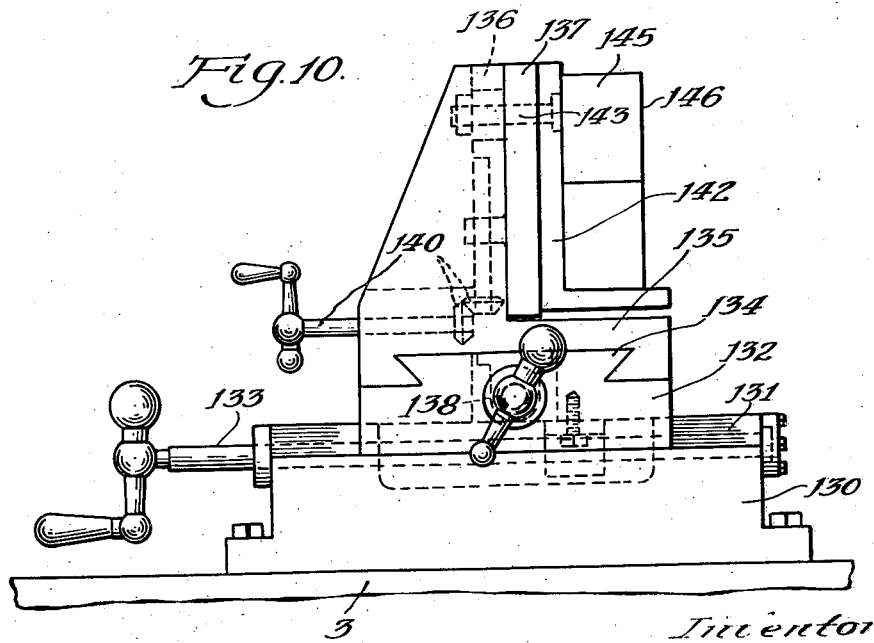
Fig. 10 is a side elevation of Fig. 9.

An important feature of this invention is the work holder now to be described, as is also the relation of the holder to the adjusting means for the tool and to the optical axis 35. First referring to Figs. 1, 9 and 10. It is noted that the work holder is arranged intermediately of two parts of the optical system. The holder comprises a base 130 bolted in grooves 129 of the table 3, said grooves being parallel with the optical axis. The base has thereon a guide 131 for a slide 132. The slide 132 can be moved horizontally in a direction parallel with the optical axis 35 by means of a suitable crank and screw generally indicated at 133. The slide 132 has a guide 134 for a cross slide 135 and this cross slide has vertical guides 136 for a vertical slide 137. The cross slide 135 is operated by a crank and screw 138, and the vertical slide 137 is operated by the crank and gears generally indicated at 140. The various means for operating the slides are well known in the art and so further description is not necessary. The arrangement of the slides, however, is believed to be new in relation to the optical system herein.

By the structure thus far recited the work can be adjusted horizontally in two directions perpendicular to one another, one of which directions is parallel with the optical axis, and the other is perpendicular thereto. The work can also be adjusted vertically by means of slide 137 and this is in a direction also perpendicular to the optical axis. An added feature is the substitute use of variously shaped fixtures, one type of which is shown at 142. In this instance the fixture is of L-shaped configuration and is rotatable about a bolt 143 as a horizontal axis. The bolt has a suitable nut by which it can be tightened to clamp the fixture in any angularly adjusted position. Mounted on the fixture is a magnetic chuck 145, which has been diagrammatically shown. It will be understood that suitable electrical connections will be provided, along with a control switch which may be mounted on the table 3. I believe it broadly new to use any type of chuck, electric or pneumatic, in my combination, as means by which work can be quickly adjusted in relation to the optical axis and thereafter strongly held. The magnetic chuck is particularly claimed because of the ease and quickness by which work can be accurately placed, or adjusted or removed.

The magnetic chuck provides a vertical surface 146 which remains perpendicular to the optical axis whatever adjustment of the slides of the work holder may occur. This surface relation should obtain for that phase of my invention wherein the cutting face of the work-piece is to be held perpendicular to the optical axis to permit the use of undistorted master drawings. Of course, for this particular phase of the invention other forms of work holders can be used, providing that the cutting face of the work-piece or tool is so held.

For holding work-pieces other than those from which form tools are to be made, my work holder can have a suitable clamp or a magnetic chuck or a pneumatic chuck, which provides a horizontal surface, as distinguished from a vertical surface such as 146. I mention this because I do not want every phase of the various new phases of this invention to be limited to the making of form tools. Moreover, work-holding surfaces may have angular relations to the optical axis other than parallel or perpendicular thereto. The use of a horizontal surface is shown in Fig. 18 in which the shaft block 160 is held on the horizontal top surface of a magnetic chuck, as distinguished from the vertical face of such a chuck. Insofar as clamps other than magnetic or pneumatic are concerned, these may be mounted on a bracket like 142 to hold the work at various angles or various forms of work holders may be substituted for the fixture 142 and mounted to swing about the bolt 143 or its equivalent.

Figure 13:
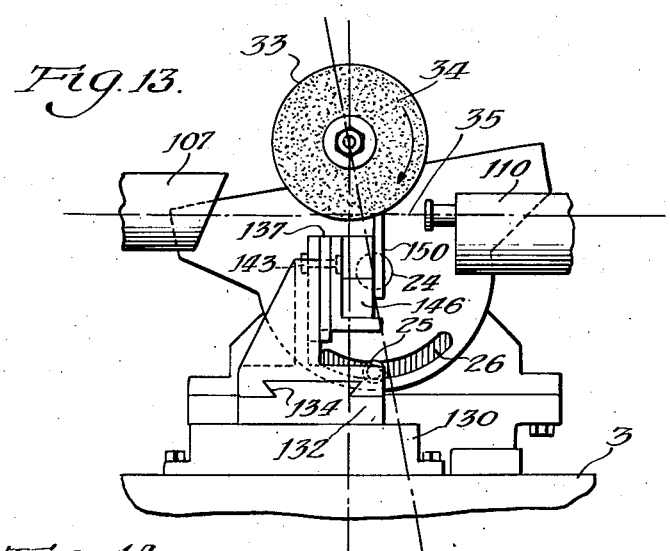
Fig. 13 is a somewhat diagrammatic front elevation showing a piece of work held by the work holder in the optical field and with the tool operating thereon.
Figure 14:
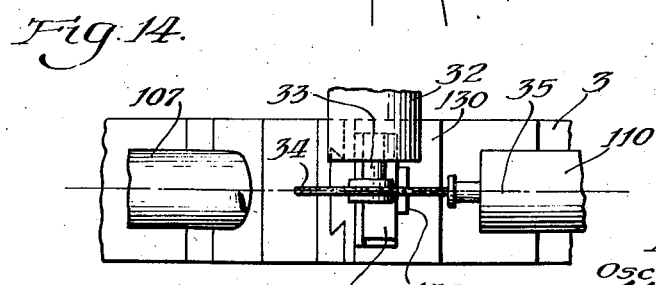
Fig. 14 is a top plan view of Fig. 13.

In Figs. 13 and 14 the cutting face is indicated at 150 and is held perpendicular to the optical axis 35. Figs. 13 and 14 show one use of the device wherein accurate shaping of an irregular cutting edge with simultaneous provision of relief may be accomplished while avoiding the use of a distorted master drawing on the shadow screen.

It will, of course, be understood that for other phases of the invention the structure of one work holder may be modified and in such instances the important feature is the means for adjusting the tool or wheel and the adjustment of the work, both in relation to the optical axis. The relative simplicity of the structure by which angular adjustment of the tool about the centers 24 and 21 is to be noted. It will also be noted that whatever the adjustment of the elements 22, 23, 9 or 6, reciprocation of the slide can occur for a shaping operation because substantially all of the power elements are carried on mount 23 or on the slide 31 or are movable with the saddle and vertical slide 9.

Fig. 15 shows one form of tool which can be produced by my machine, and Figs. 16 and 17 respectively show a side view and an end view of another form of tool which can be produced. Relieving tools for cutters may be made, male and female gauges, scraping tools, turning tools can be produced, and in all cases where the cutting face of the tool can be held perpendicular to the optical axis during metal-removing operations, an undistorted profile master drawing may be used on the screen as a means for facilitating accurate formation of the piece. Proper relief can be simultaneously had during the contour-shaping operation, and accurate profiling can be accomplished. A number of pieces can be simultaneously shaped.

It will be again noted that all of the controls of the machine are at the front near the shadow screen and work. The greatest accuracy can result from being able to constantly observe at close range the work and tool shadows in relation to the master delineation on the screen as shaping proceeds. Insofar as I am aware, it is entirely new to provide, in relation to the optical axis of an optical system which has a shadow screen, a tool which can be adjusted to various angles in relation to that axis. Adjustments of work holder slides or fixture are so made as to keep within the optical field that part of the piece being cut. During shaping or grinding the shadow of the tool or wheel will appear to move into engagement with the shadow of the work-piece.

Where the degree of magnification is such that the entire profile cannot be in the optical field at one and the same time, the enlarged master profile drawings are made up as is usual, as separate sections. This scheme may be referred to as zoning, and in such a case each separate master delineation corresponds only to the optically included part of the total outline of the work piece periphery. In this case also the work is adjusted as often as may be necessary to bring its various portions into the optical field.

My invention is not entirely confined to that use or phase in which I eliminate the necessity for making distorted master drawings. In addition, important features are the mounting of the tool (whatever its nature) so that said tool and its slide or support can be bodily adjusted in various linear planes as well as circularly; the arrangement of the tool-reciprocating means such that it moves bodily with the tool as the latter is adjusted; and in the case where a rotatable tool is used, the mounting of the tool-rotating means so that this means also moves when the tool and its slide are bodily adjusted in the various planes and/or circularly as previously mentioned.

The means for imparting reciprocatory movement to the slide on which the tool, in this instance a wheel, is mounted may comprise any suitable device, but I have illustrated a hydraulic device for accomplishing this purpose. While there is no intention to limit the broader aspects of the invention to the use of hydraulic means for the purpose, the hydraulic means which I have illustrated is also claimed per se as part of a structural unit including a slide-supporting member which is adjustable about a horizontal axis.

It will be understood that other fixtures can be used or other types of work holders may be used by which to hold a work-piece so that its cutting face is perpendicular to the optical axis or so that this face can be held at other angles with reference to said axis. Both schemes can be used with my self-contained tool-carrying, tool-operating and tool-adjusting unit. Thus, by substitution of proper holders my improved tool unit can be applied and can be used in relation to various kinds of work as held by the holder in proper relation to the optical axis of the optical system.

It will further be understood that other means, for example, electrical means, may be used to automatically reciprocate the tool slide. Whatever slide-drive means is used it will be of a character which allows angular adjustment of the rockable element, adjustment of the whole assembly circularly on a vertical axis and vertical movement of the main slide on the saddle, as well as front and rear adjusting motions of the saddle.

In Figs. 18 to 23 inclusive is illustrated a method and means by which circular tools can be formed by the practice of my invention. The method includes the holding of the periphery of a circular tool-piece in the optical axis of the optical system and the rotating of the tool-pieces so held and the causing of the forming tool to shape the periphery of the tool-piece while both are rotating. Another additional phase is the rotation of the piece and the wheel in opposite directions and the operation of the wheel at a much greater speed than that of the piece.

Other features relate to the use of a shaft for holding the work-piece and rotating it, and to the mounting of the axis of the shaft so that it is transverse to the optical axis. It will be understood that the periphery of the work-piece is concentric with the axis of rotation of the shaft and that during grinding the rotative axes of the grinding wheel and of the piece-rotating shaft are ordinarily parallel. However, since I believe myself the first to rotate a tool-piece while its periphery is in the optical field of a shadow-producing optical system, and to grind its periphery while so held, I do not intend to limit the broader aspects of the invention to the exact axial relations, although all disclosed axial relations are claimed, including those of the tool mount and work holders.

Referring first to Fig. 19, the numeral 160 indicates a block which can be attached in any suitable manner to any suitable fixture or to the slide 137 or its equivalent. This block may be magnetically attached as shown in Fig. 18 on the top of the magnetic chuck 146, carried by fixture 142, or the block can be bolted as shown in Figs. 22 and 23.

Suitably mounted in the block 160 is a tool-piece-supporting shaft 161, the rotative axis of which is horizontal. This axis is perpendicular to the optical axis 35. This particular arrangement of the axis is a feature. The shaft is held in suitable bearing sleeves 162 of the block. At one end the shaft has integral therewith a shoulder collar 164, and at the opposite end is a set collar indicated at 165. From the shoulder collar extends axially a stub shaft 167 which is threaded as shown and is adapted to fit the threaded opening 168 of a tool-piece indicated at 169. As will be seen in Fig. 19, the periphery of the tool-piece is somewhat irregular, and it is this irregular surface which is to be either formed or finished by the use of my invention. The shaft 161 has an extension 170 to which is attached any suitable flexible shaft indicated diagrammatically at 171. This shaft is connected with a suitable motor 172 also diagrammatically illustrated. This motor may be placed on a vertical side or front of the bed, or on top of the same in any convenient location, and its purpose is to properly rotate the shaft 161 and therefore the tool 169.

It will be noted in Figs. 18 and 19 that the bottom portion of the periphery of the circular work-piece is arranged at the optical axis 35 or in the optical field. The extension 107 of the light-source casing, is shown in Fig. 19 as is also the condensing lens 108.

In Fig. 20 the finished article of Figs. 18 and 19 is shown and is indicated by numeral 169'.

In Fig. 22 the block 160 has been shown provided with a suitable bolting flange 175 and in this instance the block is attached to the horizontal portion of a fixture 142, which fixture is rotatable about the horizontal axis 143. In both Figs. 18 and 22 it will therefore be seen that the block with its shaft and circular tool-piece can be tipped at various angles about an axis which is parallel with the optical axis. This is a feature.

In Fig. 23 the block 160 is attached by a flange 176 to the vertical face 177 of the vertical slide 137. This is a feature.

Features of this phase of the invention include both method and means. The method includes the steps of holding a portion of the periphery of the circular tool-piece or work-piece in the optical axis, and rotating the tool-piece on an axis that is perpendicular to the optical axis. In one phase of the invention the tool-piece and grinding wheel rotate in opposite directions at the point of contact.

Ordinarily the rotating rate of the grinding wheel is about 1800 R. P. M., while the rotating rate of the tool-piece shaft is about 300 R. P. M. The holding of the block or shaft 161, so that it can be angularly adjusted on an axis which is parallel with the optical axis, allows angular surfaces such as surfaces 180, 181, 182, to be brought to a horizontal position. This is a valuable feature. By using a magnetic chuck, the block itself or an equivalent bearing for the shaft 161 can be attached in angular relation, in which case angular adjustment of a fixture can be dispensed with. This is per se a feature. In Fig. 23, since the fixture 142 has been removed, the opening for the bolt or axis 143 has been indicated in dotted lines by the numeral 143'.

It is to be understood that while the details of the various work holder constructions are claimed, in relation to one phase of this invention, yet for another phase of the invention work holders of other constructions may be substituted and secured to the table 3 in the slots 129. Moreover, the elements 106 and 110 may be more widely spaced. The table 3 may be longer at its left hand end. The casing 110 may be held by means entering the slots 129 and therefore this casing may be moved lengthwise of the table 3. In the practice of the invention different optical systems may be used, and adjustments of the objective lens and prism system may be made. The proportions and dimensions of the work holders may be varied to accommodate different sizes and types of work, without departing from the principles of the invention.

It will further be understood that the invention is not entirely limited to the particular proportional range of movements of the slides of the work holder. These movements may be increased or decreased. The arrangement of the adjustment planes of the slides 132, 135, 137 and of the axis 143 are believed to be entirely new in relation to the optical axis of a shadow-producing optical system, whatever the latter's construction, and in addition this structure in combination with my tool driving and tool adjusting unit is believed to be entirely new in relation to such an optical system and to work held in the optical axis thereof.

The light source and the objective system may be so located that the optical axis is arranged at one side of the work holder so that no slide of the latter can ever be so moved as to enter the optical field.

Whatever the character of the work holder, either for flat-form tool or circular tool grinding, the relations of the optical axis and the work holder will always be such that no part of the holder will intercept the light rays, that is, interfere with the proper production of the proper enlarged shadow of the periphery of the work piece during forming.

I believe I am the first to conceive of forming the cutting edges of circular tools, while an enlarged shadow of the profile of the periphery of such a tool is being projected onto a shadow screen. I also believe I am the first to use, either with or without a shadow-producing optical system, a work holder and a tool-operating and adjusting means having the various angular adjustments specifically shown in the drawings.

The relation of the planes and angles of adjustment of the reciprocable tool-supporting slide to the planes and angles of adjustment of the work holder to one another, and either or both in relation to the optical axis, I believe to be entirely new.

The casing 32 has for convenience been represented as integral with the slide 33, but it will preferably be detachably secured to the slide. Also tools of various types may be removably attached to the slide. The use of the motor driven grinding wheel is believed new in my combination, yet I contemplate the use of other tools on the power driven slide, which slide in turn is capable of being adjusted linearly in various directions and angularly as previously set forth. This bodily adjustment of the reciprocable tool holder or slide along with its driving means angularly about a center or centers and/or linearly in relation to a work-holder adjustable in the planes set forth, provides a very flexible combination of adjustments of the tool-carrier means in relation to the work-holding means or of either or both in relation to the optical axis of a shadow-projecting optical system. All of these phases are claimed in various combinations as providing a flexibility of adjustment between tool and work-piece not, insofar as I am aware, heretofore conceived of in any metal-working tool, either for shaping or grinding or milling. The full-view placement of such structures in relation to a stationary shadow-projecting system, is believed to be entirely new.

What I claim is:

1. A metal working machine comprising a saddle, a vertical slide on the saddle, a mounting member on the slide adjustable about a vertical axis, a rock frame on the mounting member adjustable about a horizontal axis, a tool slide reciprocable on the rock frame, a tool on the slide rotatable on a horizontal axis, means carried by the slide for rotating the tool, and means carried by the rock frame for reciprocating the tool slide.

2. A metal working machine comprising a saddle, a vertical slide on the saddle, a mounting member on the slide adjustable about a vertical axis, a rock frame on the mounting member adjustable about a horizontal axis, a tool slide reciprocable on the rock frame, a tool on the slide rotatable on a horizontal axis, stationary means over the saddle for holding work, an optical system in part over the saddle and in stationary relation to the work holder and adapted to constantly project, during operation of the tool on work held by the work holder, an enlarged shadow of a periphery of the work onto a shadow screen which is placed laterally of and near the saddle, and means by which the work holder can be adjusted to keep constantly in the optical field of said optical system that part of the periphery of the work from which metal is being removed.

3. A device of the class described comprising a saddle movable in a horizontal direction from front to rear and having thereon a slide movable in a vertical direction, a support rotatable on the top of said slide on a vertical axis, a frame on the top of said support rockable on a horizontal axis, a tool slide on the top of the frame movable in a plane perpendicular to said horizontal axis, a tool on the top of said slide rotatable on an axis parallel with that of said horizontal axis, and means on the top of said slide for rotating the tool, and a work holder forwardly toward which the saddle moves.

4. A device of the class described, comprising an optical system adapted to continuously project a magnified shadow of work onto a shadow screen, a grinding wheel adapted for operation on the work, plural means for respectively adjusting the work circularly on an axis which is parallel with the optical axis and in relation to the optical field and for adjusting the wheel relative to the work and to the optical field and circularly about an axis which is perpendicular to the optical axis, the said optical system including a shadow screen which is circularly adjustable complementally to the circular adjustment of the work, and independent means for automatically reciprocating the wheel in relation to the work to perform a grinding operation in which the wheel is alternately engaged with and disengaged from the work.

5. A device of the class described comprising, an optical system adapted to continuously project a magnified shadow of work onto a shadow screen, a tool adapted to operate on the work, plural means respectively for adjusting the work in two horizontal planes which are respectively perpendicular to and parallel with the optical axis of the optical system and for adjusting the tool horizontally and vertically in planes perpendicular to one another and respectively perpendicular to the optical axis, and independent means for automatically reciprocating the tool in relation to the work.

6. A device of the class described comprising, an optical system adapted to continuously project a magnified shadow of work onto a shadow screen, a tool adapted to operate on the work, plural means respectively for adjusting the work in two horizontal planes which are respectively perpendicular to and parallel with the optical axis of the optical system and circularly on a horizontal axis which is parallel with the optical axis, and for adjusting the tool horizontally and vertically in planes perpendicular to one another and respectively perpendicular to the optical axis, and circularly about a horizontal axis which is perpendicular to the optical axis, said optical system including a shadow screen which is circularly adjustable on a horizontal axis complementally to the circular adjustment of the work on its horizontal axis, and independent means for automatically reciprocating the tool in relation to the work.

7. In combination with an optical system adapted to project onto a screen a magnified shadow of the profile of that face of a work piece on which a forming tool operates, means by which a work piece can be adjusted to and held in a position at which the surface to be formed is in the optical axis or optical field, a forming tool, means by which the tool can be reciprocated, plural means by which the tool with its reciprocating means can be angularly adjusted on either of two axes, both of which are transverse to the optical axis, and means for bodily adjusting all of the last mentioned means, including the tool in either of two directions which are transverse to said optical axis.

8. A machine for grinding hard metals, including a shadow-projecting optical system which has an objective and in which the optical axis is horizontally disposed, a work holder below the level of said horizontal axis adapted to rigidly hold a work-piece with a flat face thereof in perpendicular relation to the optical axis and facing said objective, and comprising three slides and means for separately moving each respectively to move the top of the work-piece into the optical field, to focus the top of the work in said field, and while maintaining the focused relation to move the top of the work horizontally with reference to said optical axis, all the while maintaining said perpendicular relation of said face to said optical axis.

9. A device of the class described, comprising a bed, an elongated board-like table immovably secured on the top of the bed at its extreme front, a complete shadow-projecting optical system on the table including a screen, a work holder also on the table disposed intermediately of a light source and an objective of said system and below the optical axis of the system, and adapted to move the work upwardly into and hold the top surface of work in the optical field of said system, a carrier on the bed movable in a direction transverse to the table and optical axis, a vertical slide on the carrier arranged rearwardly of the table and a grinding wheel as the topmost element on said slide and operative on a horizontal axis to engage the top of the work as held in the optical field by the holder, and plural means respectively for moving the carrier forwardly and the slide vertically and for operating the tool, including controls arranged forwardly of and immediately adjacent said table and work support, the shadow screen of said system being arranged in upright position laterally of and near said controls.

10. A device of the class described comprising, a hollow bed, a carrier movable horizontally on the top surface of the bed in a direction from front to rear, a hollow vertical slide on the carrier extending thereabove and downwardly into the hollow bed, a grinding wheel on the slide rotatable on a horizontal axis with the wheel projecting forwardly to overhang the carriage, a work holder on the top of the bed forwardly of the slide and toward which said slide is movable by the carrier and adapted to hold work so that the wheel may approach its top surface from above, hydraulic means substantially entirely movable with the vertical slide and adapted to reciprocate the tool in a direction transverse to the direction of carriage movement, and including a motor driven pump within said hollow slide, and separate means also movable with said slide for rotating the grinding wheel.

11. A device of the class described, comprising a bed having an upwardly and rearwardly opening chamber at the rear, a carriage horizontally movable on the top of said bed from front to rear and having upright guides which extend downwardly into the chamber of the bed, a first slide movable upwardly and downwardly on said guides and extending downwardly into the chamber of the bed and upwardly above the top of the carriage, and having a rearwardly opening chamber having a motor driven fluid pressure pump therein, a second slide reciprocably mounted on the first slide, a grinding wheel on the second slide, a driving motor for the wheel supported on said second slide, means for automatically reciprocating said second slide, including fluid operable means having fluid connections with said fluid pressure pump, and a work support on the bed stationary in relation to the carriage adapted for supporting work for engagement by said grinding wheel.

12. A device of the class described, comprising a bed, a work holder stationary on the bed, a carriage horizontally movable on the top of said bed toward and away from the work holder, and having thereon a first slide vertically movable and carrying a motor driven fluid pump, a series of elements arranged in superposed relation on the top of said vertical slide in the following sequence: a first element rotatable on a vertical axis and having upwardly extending spaced arms forming a fork, a second element having a downwardly extending fork the arms of which are rockably pivoted to the arms of the first element, a tool slide reciprocably mounted on said second element, a grinding wheel and means journalling it on the tool slide, a driving motor for the wheel supported on said slide, and means for automatically reciprocating said slide including fluid operable means carried by the second element in part between the forks and fluid connections between said fluid operable means and pump.

13. A device of the class described, comprising an optical system by which an enlarged shadow of the contour of a workpiece can be projected onto a shadow screen, the optical axis of said system being horizontal, means for holding the top face of the work-piece in the optical field or axis of said optical system with one face of the piece perpendicular to the optical axis, a grinding wheel and means mounting it to rotate on a horizontal axis, means by which the wheel can be brought downwardly toward the optical axis and top of the work-piece, means by which the wheel can be adjustably swung on a center about an axis which is parallel with the axis of rotation of the wheel to cause the wheel to simultaneously contour-grind a cutting edge on the work-piece and provide clearance for said edge, means for rotating the wheel and means for reciprocating the wheel to cause it to alternately engage and disengage the work.

14. A device of the class described, comprising a support, angularly adjustable about a vertical axis, a frame on said support rockable about a horizontal axis thereon, a slide translatable on the top of said frame, a rotatable tool mounted on the top of said slide and having means also on said slide for driving it, and means for automatically reciprocating said slide, said means being carried by said slide and rockable frame, said support being angularly adjustable on a slide which is in turn vertically adjustable upon a horizontal slide, a stationary member bridging said horizontal slide, a work holder on said bridging member adapted to hold a work-piece for operative engagement of its top by said rotatable tool, and an optical system adapted to cast an enlarged shadow of the top periphery of a work-piece held by said work holder onto a shadow screen, while said rotatable tool is removing material from the top surface of said work-piece.

15. A device of the class described, comprising a support, angularly adjustable about a vertical axis, a frame on said support rockable about a horizontal axis thereon, a slide translatable on said frame, a rotatable tool mounted on said slide and having means also on said slide for driving it, means for automatically reciprocating said slide, including fluid-operable means mounted on said rockable frame, and on the slide including a main piston operably connected with said slide, first valve means for controlling reversing movements of the piston, second valve means for controlling the first valve means, a lever controlling the second valve, and means on said slide for operating said lever to control the second valve.

16. A machine of the class described, comprising a shadow-projecting optical system having a horizontal optical axis, a magnetic chuck arranged intermediately of a light source and an objective of said system, a journal block magnetically held by said chuck and having a shaft rotatable thereon, which is disposed in horizontal and perpendicular relation to said axis, means for attaching a work-piece to said shaft, means for automatically rotating said shaft in a given direction, said chuck having means by which it can be separately adjusted in either of three directions which are perpendicular to one another and one of which directions is parallel to said optical axis, said means being adapted to maintain the horizontal and perpendicular relation of the shaft to the optical axis during such adjustments, a grinding wheel and means for rotating the grinding wheel to operate on said work-piece while said piece is rotating in said given direction and in the optical field, and the said grinding wheel having means for adjusting it so that it can approach said work-piece from above.

17. A device of the class described comprising, an optical system adapted to project a magnified shadow of the work onto the shadow screen, a work holder, having means adapted to adjust the work in relation to the optical field of said system, said means having detachably secured thereto a block having a work shaft journaled therein, said shaft having means by which a piece of work can be attached to it, a flexible shaft for driving said work shaft and allowing adjusting movements of said work adjusting means of said holder, and a rotative tool adapted to operate on work held on said work shaft.

18. A device of the class described comprising, an optical system adapted to project a magnified shadow of the work onto the shadow screen, a work holder arranged below the optical axis of said optical system and having, first means adapted to move the work upwardly into the optical field of said system, said means having thereon a magnetic chuck, a magnetic block magnetically held by said chuck and having a work shaft journaled therein, said shaft having means by which a piece of work can be attached to it, said work holder having second means adapted to move the first means crosswise of the optical axis and further having third means adapted to move the first and second means lengthwise of the optical axis, a rotative tool adapted to operate on the top of work held on said work shaft, and a flexible shaft for driving said work shaft, and allowing adjusting movements by said work-moving means of said work holder.

19. A metal-working machine comprising, a saddle having a vertical slide thereon, a shadow-producing optical system in front of the slide and adjacent the front of the machine and having a horizontal optical axis, a mounting member on the top of the slide adjustable about a vertical axis, a rock-frame on the mounting member adjustable about a horizontal axis, a tool slide reciprocable on the rock-frame in a direction transverse to said horizontal axis of the rock-frame, a tool on the slide rotatable about a horizontal axis which is parallel with the horizontal axis of the rock-frame, and means at the front of the machine respectively for moving the saddle forwardly and rearwardly, and for raising and lowering the vertical slide.

OSCAR C. HEDIN.